April 7, 1964

W. E. JAMES 3,127,962

JOINT FOR PANELS

Filed Dec. 21, 1960

INVENTOR.
WILLIAM E. JAMES
BY
ATTORNEY

United States Patent Office 3,127,962
Patented Apr. 7, 1964

3,127,962
JOINT FOR PANELS
William E. James, Witmer, Pa., assignor to Sperry Rand Corporation, New Holland, Pa., a corporation of Delaware
Filed Dec. 21, 1960, Ser. No. 77,408
1 Claim. (Cl. 189—36)

This invention relates to improvements in joints for panels, and, more particularly, elongated metallic panels such as are suitable for use in building structures of various kinds in which said panels may serve as roofing, ceilings, siding, or various kinds of partitions which may be either horizontal, vertical, or otherwise.

Although many kinds of panels and connections for panels are presently available, relatively few of these are arranged for connection by simple means so as to produce a substantially air-tight connection between two adjacent panels, for example. Such air-tightness as may be desired presently is obtained principally at the expense of relatively complex gasket means which is difficult to install in long lengths. Further, final connection of adjacent edges of panels, even when employing gaskets, usually requires the use of bolts, rivets, or the like, spaced relatively closely and the application of the same frequently requires access to both surfaces of the panels, unless, for example, self-tapping screws are employed, and even the use of such screws requires the forming of aligned holes within the panels to receive the screws.

The principal object of the present invention is to provide panels having connecting means extending along opposite lateral edges thereof, said connecting means preferably being formed integrally with said panels, and the shape of the connecting means is such that substantial areas of material comprising the connecting means are in tight abutment with each other when the panels are disposed in the final desired position relative to each other, such as within a common plane, no additional connecting means, such as bolts, rivets, or the like, or even gasket means, being required to effect a substantially air-tight seal between adjacent panels.

Still another object of the invention is to provide connecting means which not only effect a substantially airtight seal between adjacent panels when the connecting means are disposed in final position relative to each other, but said connecting and sealing means also afford substantial rigidity to the connected panels, especially in a longitudinal direction, whereby opposite ends of the panels may be supported upon suitable supporting members, while the areas between the opposite ends require either no, or very little, additional support even for substantially long spans of such panels.

A still further object of the invention is to so construct said connecting means that they are relatively inexpensive to form upon the opposite lateral edges of the panels and the connection of adjacent edges of two panels is accomplished very quickly, whereby installation costs are minimized.

Details of the foregoing objects and of the invention, as well as other objects thereof, are set forth in the following specification and illustrated in the accompanying drawing comprising a part thereof.

Figure 2:
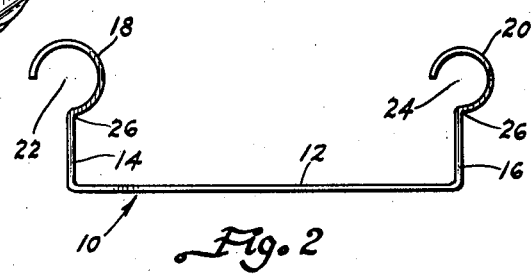
FIG. 2 is an end view of an exemplary panel having connecting means extending along opposite lateral edges thereof and embodying the principles of the present invention, the scale used in this figure being greater than that employed in FIG. 1.
Figure 3:
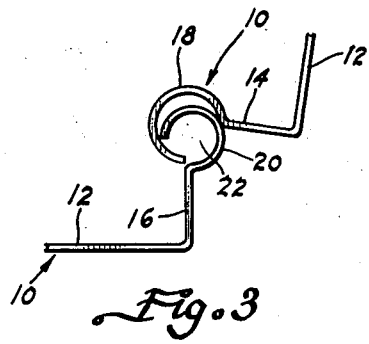
Figure 4:
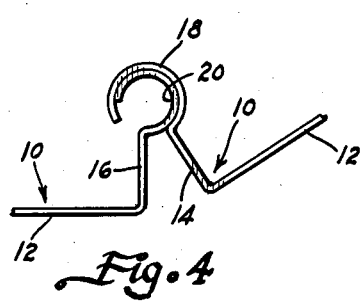
Figure 5:
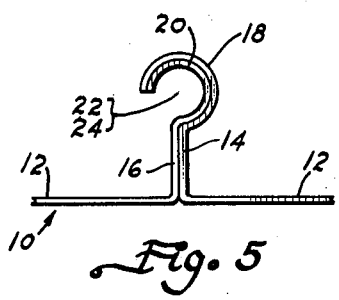

FIGS. 3, 4 and 5, respectively, are fragmentary end views on the same scale as in FIG. 2 and showing adjacent edges of two fragmentarily illustrated portions of panels progressively in the process of being connected together and illustrating a wiping action which occurs between the connecting members extending longitudinally along the edges of said panels, FIG. 5 illustrating the members and panels in the positions they assume when fully connected together in accordance with the principles of the invention.

Referring to the drawing, it will be seen that the panels 10 comprise substantially flat panel sections 12, per se, which are relatively narrow compared with the length thereof. In actual practice, the length may be quite substantial, such as the order of 10 or 12 feet, or even longer, whereas the width may be of the order of 12 inches, but, obviously, said width may be either less or greater and the foregoing indications as to both length and width are not to be regarded as restrictive, but merely exemplary.

The panels 12 may be formed from any suitable material, such as suitable thicknesses of sheet metal selected from the class comprising steel, copper, aluminum, or any other suitable metal. However, the invention is not restricted to using metal inasmuch as appropriate synthetic resins, and the like, either reinforced or not by such materials as glass fibers, may be utilized within the spirit of the present invention.

The panels 10 each also include connecting means which, in the preferred embodiment thereof, comprise flanges 14 and 16 which, preferably, are integral with the panel sections 12 per se and extend, preferably, vertically from the same surface of panel sections 12 along the opposite lateral edges thereof. In the preferred construction of the invention, the flanges 14 and 16 are coextensive in length with panel sections 12 and also are substantially parallel to each other, for reasons to be described.

Connected respectively to the outer ends of flanges 14 and 16 are similarly shaped connecting members 18 and 20 which are elongated segments of cylinders having elongated spaces 22 and 24 between the connected and free edges of the connecting members 18 and 20. The connected edges of said members preferably are connected integrally to the outer edges of flanges 14 and 16.

Preferably, connecting members 18 and 20 are similarly shaped and the connecting member 20 on one panel is received within the connecting member 18 on the adjacent panel. Under such conditions, the flange 16 of one panel will be in firm abutting relationship with the flange 14 of the other panel over substantially the entire areas thereof and, due to the thickness of the material from which the panels 10, flanges 14 and 16, and the connecting members 18 and 20 are formed, a certain amount of expansion of members 18 will be caused when surrounding members 20, resulting in very firm and extensive sealing engagement therebetween. A certain amount of lubricant may be used between members 18 and 20, if desired, not only to facilitate such connection, but also to render the connections therebetween as air-tight as possible. If the thickness of the material from which the panels are formed is substantially great, it is preferred that the member 18 have a slightly greater diameter than member 20, but the outer diameter of connecting members 20 should, nevertheless, be slightly greater than the inner diameter of connecting members 18. Such difference need only be of the order of a few thousandths of an inch, particularly since very suitable panels can be used for roofing, siding, ceilings, and the like, which have a thickness only of the order of .030", for example. This dimension is not to be regarded as restrictive, however, since suitable panels for various purposes can be constructed to employ the present invention and yet be either thinner or thicker than this exemplary specified dimension.

It also will be seen that the cylinder segments 18 and 20 comprising connecting members on the panels 10 extend substantially more than 180° around the axes thereof. In the specific illustration shown in the drawing, the members 18 and 20 extend substantially 270° around their axes, whereby, in end view, the connecting members and flanges connected thereto somewhat resemble a conventional question mark in appearance. It will be understood that the members 18 and 20, as well as the flanges 14 and 16, also are co-extensive in length with the panel sections 12. Further, the outer edges of the connecting members 18 and 20 are within the cylindrical configuration of the segmental cylinders comprising members 18 and 20. That is, the outer edges have no different shape than any other portion of the cylindrical connecting members 18 and 20, whereby, when one of the members 20 is received within the outer member 18, and due, particularly, to the inherent resilience in the material, such, for example, as steel, copper, aluminum, or synthetic resin, from which the panel and connecting means are formed, a firm and substantially air-tight engagement will result between very substantial areas upon said connecting members.

In view of the fact that the flanges 14 and 16 extend perpendicularly from one surface of the panel sections 12 per se of each of the panels 10, and also in view of the configuration resulting from the cylindrically shaped connecting members 18 and 20, which are integrally fixed at one edge to the outer edges of flanges 14 and 16 so as to form a sharp angle 26 at the junction thereof, together with the cylindrical shape of the connecting members 18 and 20, very substantial rigidity is afforded the panel sections 12 per se, whereby very appreciable lengths of said sections may be utilized without intermediate support and without appreciable sagging of the panels intermediately of the length thereof. Further, if abnormally long panels are desired without intermediate support, it is only necessary to form the flanges 14 and 16 so as to be longer in the vertical direction from panel sections 12 and, possibly, provide the connecting members 18 and 20 with correspondingly greater diameters, whereby, in effect, the cylindrically shaped connecting members 18 and 20 comprise transverse flanges which brace the outer edges of flanges 14 and 16 so as to prevent the same from buckling. This effect is similar to that afforded the webs of I-beams by the top and bottom flanges thereon. Such bracing arrangement, according to the invention, is also due to the fact that the axes of the cylindrical connecting members 18 and 20 substantially are within the planes of the flanges 14 and 16. Actually, said axes of members 18 and 20 preferably are within the planes of the outer surfaces of the flanges 14 and 16, as viewed in FIG. 2.

Figure 1:
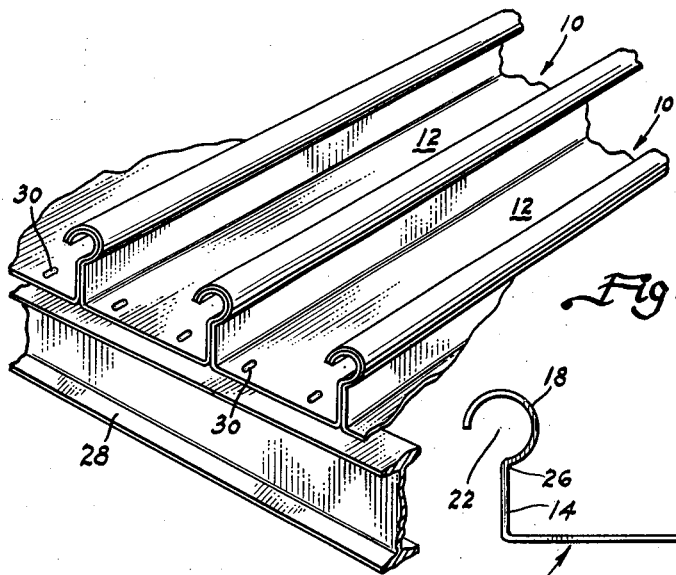
FIG. 1 is a fragmentary perspective view showing adjacent ends of a plurality of metallic panels which are connected together by connecting means embodying principles of the present invention, said adjacent ends of the connected panels being shown resting upon a supporting member, such as a beam, to which said ends are connected.

To connect the panels 10 to suitable supporting means, by reference to FIG. 1, it will be seen that the ends of the panels may be placed upon suitable transverse supporting members 28, such as wooden or metallic beams which may constitute ceiling stringers, roof purlins or rafters, floor joists, or any other suitable building members capable of supporting such panels for a specific purpose. One of the principal purposes of the invention is to provide substantially air-tight sealing between adjacent panels, and in order that such sealing may not be deteriorated where said panels engage supporting means, suitable caulking or gasket means may be disposed, if desired, between the supporting surface of the members 28 and the outer flat surfaces of the panel sections 12 per se when placing said panel sections against the supporting members 28. Such use of auxiliary sealing means will depend upon the degree of air-tightness desired within an enclosure formed by said panels, for example.

For purposes of securing the panels to the supporting members 28, said panels may be provided with any appropriate means, such as elongated holes 30, of any appropriate number, in opposite ends of the panel sections 12 per se. Further, the panels 10 preferably are mounted so that the flanges 14 and 16, as well as connecting members 18 and 20 thereon, extend uppermost, particularly if the panels are to be used to form ceilings, roofs, or the like. When used as roofs, the ribs and connecting members will extend longitudinally of the direction of the slope of the roof so as to minimize the trapping of water between the flanges and connecting members of any panel 10.

In assembling a plurality of panels 10, the procedure outlined in sequence in FIGS. 3 through 5 may be utilized. One of the panels 10 is first made fast to a supporting means, such as a beam member 28. Next, another panel 10, which is to be placed adjacent the previously fixed panel, is disposed with its larger connecting member 18 adjacent the smaller connecting member 20 of the fixed panel, if panels with different diameters of connecting members are used at opposite edges, and the member 20 is projected through the opening 22 of the larger connecting member 18 so as to assume the general arrangement shown in FIG. 3. Suitable lubricant material may first be placed upon one or both of the co-engageable surfaces of members 18 and 20, if desired, to ease the connecting movement. Then, the member 18 and its panel section 12 is moved in the direction of the arrow shown in FIG. 3, whereby a wiping action takes place between the tightly interfitting connecting members 18 and 20 to produce a tight seal, the lubricant, if used, adding to the sealing effect. If connecting members of the same diameters are used, the outermost one, when connected to another, will be slightly expanded to effect a firm engagement of substantial area between the two members.

When the panels are in the relative positions shown in FIG. 4, it will be seen that elongated circumferential portions thereof greater than 180° are in engagement on the members 18 and 20, whereby they could not be separated without distorting the members 18 and 20, for example, if separation was attempted in a radial direction opposite to the openings in said members 18 and 20. Due to the inherent resilience of the material from which the members are made, a very close and firm overall contact is made between the outer surface of member 20 and inner surface of member 18 during such pivotal and wiping connecting movements between the two panels 10 which are being connected. Such relative movement is continued until the flange 14 on the moving panel 10 abuts the flange 16 on the stationary, previously fixed panel 10, whereupon it will be found that the panel sections 12 of both of the panels now are in a common plane and the opposite ends of the panel section 12 of the panel which has just been moved into locking engagement with the previously fixed panel can be connected to the beam member 28 and is in position for another panel to be connected thereto.

Due to the abutment of flange 14 on one of the panels with the flange 16 on the other panel, incident to such connection of the panels as described above, further sealing is effected between the connected panel sections 12 of the panels 10 by such abutment, in addition to the very extensive seal taking place between the connecting members 20 with the connecting members 18.

Also, while it is preferred that the openings 22 and 24 be provided within the connecting members 18 and 20, especially for purposes of facilitating and providing easy connection between adjacent panels, substantially the full surface of the connecting members 18 and 20 is utilized for sealing purposes when the connected panel sections 12 are disposed within a common plane, as is clearly evident from FIGS. 1 and 5, wherein it will be seen that the outer edges of the connecting members 18 and 20 are coincident with each other and, likewise, the openings 22 and 24 are coincident with each other.

When adjacent edges of panels 10 are connected together and are disposed within the relationship shown in FIGS. 1 and 5, it will be seen that the abutting flanges 14 and 16, as well as the firmly coinciding connecting members 18 and 20, will supplement each other in providing rigidity to the panels so as to render them self-supporting lengthwise between spaced supporting members 28, for example, and the sealing effect of the flanges 14 and 16 augments the very appreciable sealing effect existing between the tightly nested cylindrical segments comprising connecting members 18 and 20. Further, by reason of the fact that the outer ends of the connecting members 18 and 20 are part of the cylindrical configuration of said connecting members, there is no scraping or cutting which can take place during the connecting operations illustrated progressively in FIGS. 3 through 5. Also, when connected and in use over long periods of time, and assuming that the connected members may be subjected to vibrations, there is substantially no possibility of such vibrations resulting in puncturing any of the members, as would be the situation if a sharp edge of one of said members, for example, was in engagement with a flat or transverse area of the other member.

As is quite evident from FIGS. 1 and 5, it will be seen that only smoothly flat or smoothly cylindrical surfaces principally are in engagement with each other to constitute sealing means between adjacent panels.

Although the panel sections 12 are shown to be flat, it is to be understood that they may be curved transversely in the event, for example, a cylindrical enclosure is to be formed by a plurality of such connected panels 10.

While the invention has been described and illustrated in its several preferred embodiments, and has included certain details, it should be understood that the invention is not to be limited to the precise details herein illustrated and described since the same may be carried out in other ways falling within the scope of the invention as claimed.

I claim:

Panels of resilient sheet material of uniform thickness provided along opposite lateral edges with integral parallel flanges of substantially equal width perpendicular to said panels and terminating in connecting members of self-connecting type and comprising elongated sections of cylinders connected integrally along one edge respectively to and extending longitudinally along said terminal edges of said flanges of said panels, said cylindrical connecting members being of single thickness of said sheet material and extending substantially more than 180° about the axes thereof between the connected edges and free edges thereof but providing adequate space between said edges of at least one cylindrical connecting member on each panel to receive the cylindrical connecting member on the opposite edge of an adjacent panel when said panels are being connected together and the inner diameter of one member being slightly less than the outer diameter of the other member of an adjacent panel received therein when said panels are connected together by said members so as to render said connection substantially air-tight and said members being substantially coincident when adjacent panels are connected together and said panels are disposed within a common plane, the axes of said connecting members being substantially within the planes of the abutting flanges which support said members when in connected position, whereby the terminal edges of said connecting members overhang said flanges when extending vertically from said panels.

References Cited in the file of this patent

UNITED STATES PATENTS

| | | |
|---|---|---|
| 841,276 | Stasch | Jan. 15, 1907 |
| 1,198,939 | McDowell | Sept. 19, 1916 |
| 2,159,136 | Delk | May 23, 1939 |
| 2,484,609 | Clark | Oct. 11, 1949 |